June 30, 1925.
L. B. GREEN
DUSTING APPARATUS
Filed Sept. 8, 1923
1,543,916
3 Sheets-Sheet 1
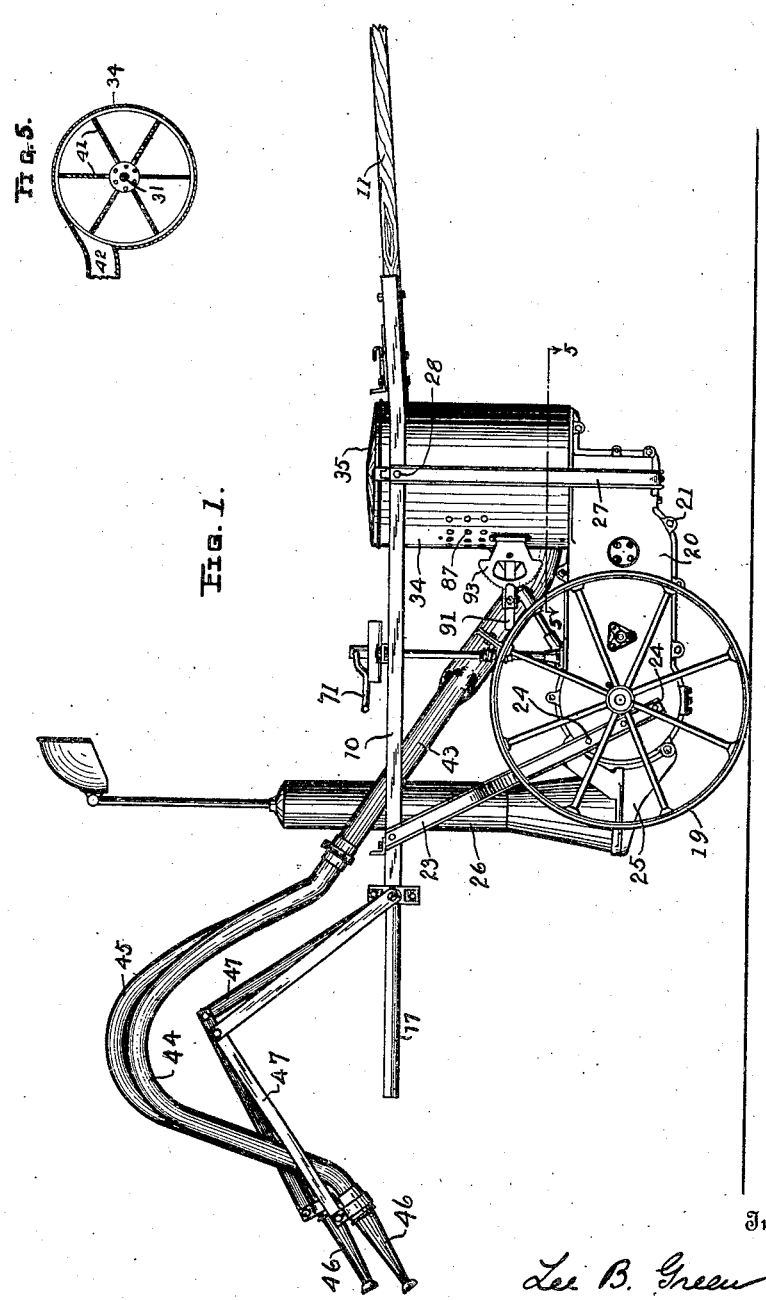
Inventor
Lee B. Green
By Bu. Kent
Attorney June 30, 1925.
L. B. GREEN
DUSTING APPARATUS
Filed Sept. 8, 1923
1,543,916
3 Sheets-Sheet 2
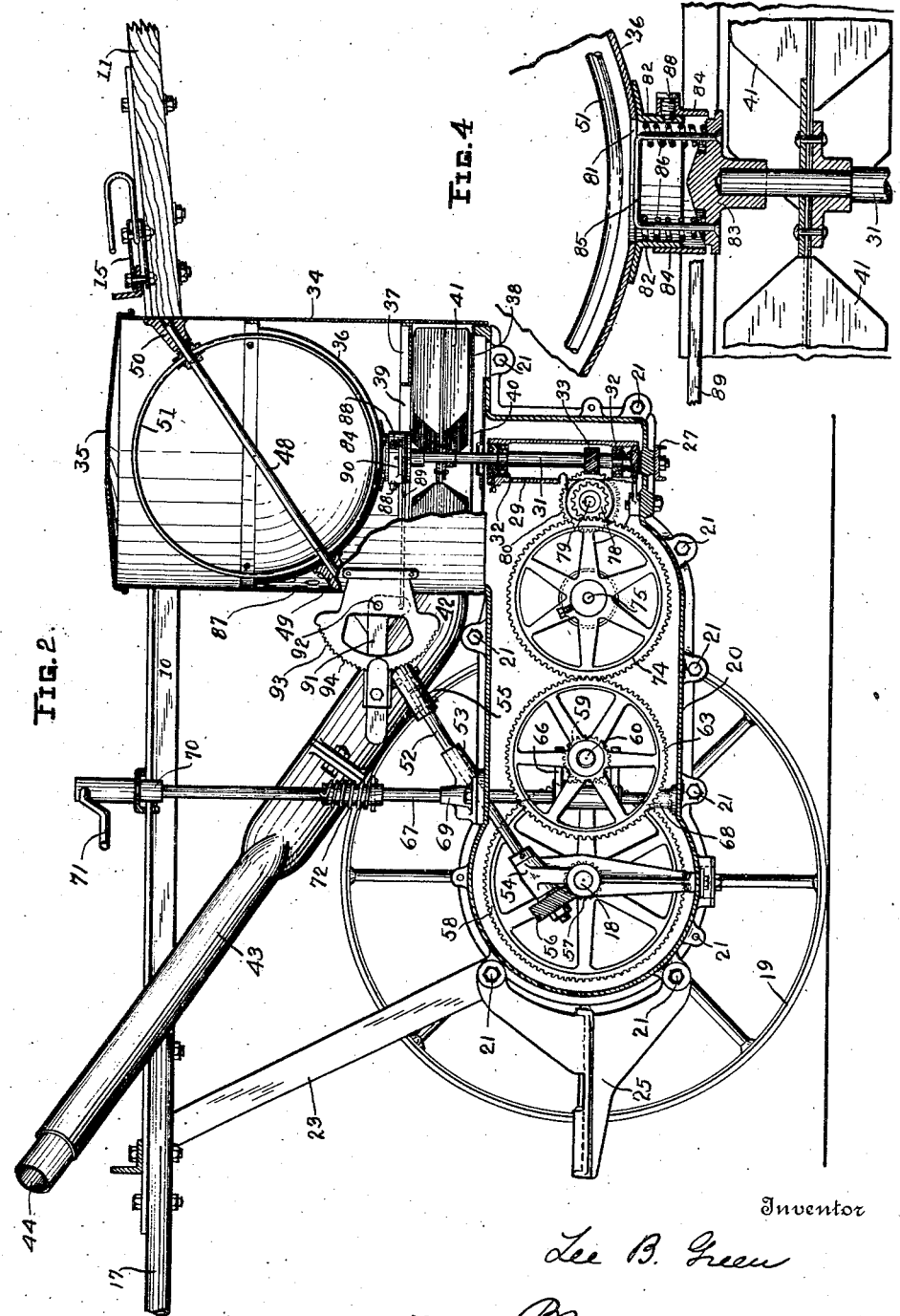
Inventor
Lee B. Green
By
Attorney June 30, 1925.
L. B. GREEN
DUSTING APPARATUS
Filed Sept. 8, 1923
1,543,916
3 Sheets-Sheet 3
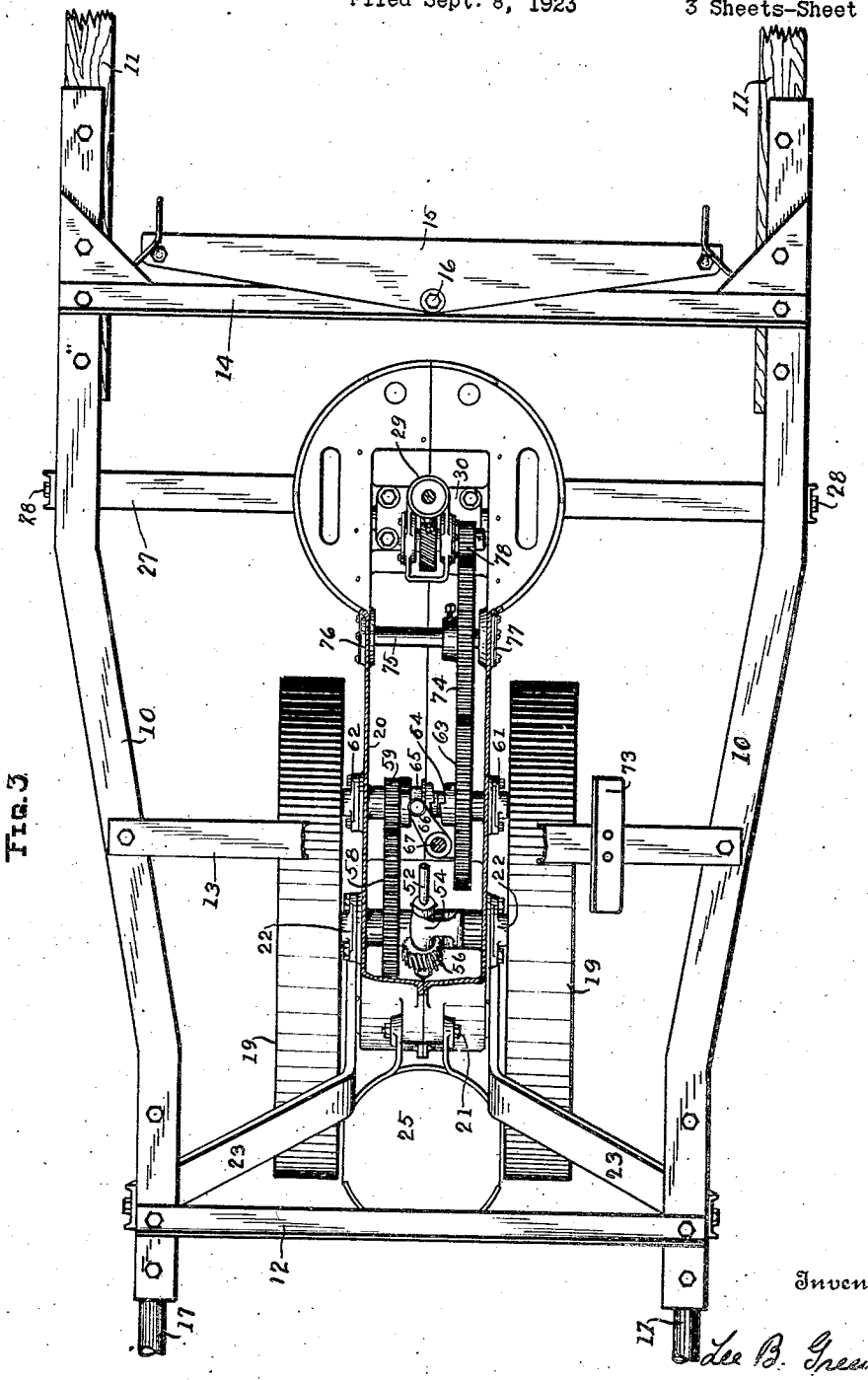
Inventor
Lee B. Green
By
Attorney Patented June 30, 1925.

1,543,916

UNITED STATES PATENT OFFICE.

LEE B. GREEN, OF LAKEWOOD, OHIO, ASSIGNOR TO THE GLOBE MACHINE AND STAMPING COMPANY, OF CUYAHOGA, OHIO, A CORPORATION OF OHIO.

DUSTING APPARATUS.

Application filed September 8, 1923. Serial No. 661,585.

*To all whom it may concern:*

Be it known that I, LEE B. GREEN, a citizen of the United States, and a resident of Lakewood, county of Cuyahoga, State of Ohio, have invented certain new and useful Improvements in Dusting Apparatus, of which the following is a specification.

This invention relates to apparatus for spraying vegetation with insecticides and more particularly to that type of apparatus commonly known as a dusting machine for spraying a dry powder.

It is one of the objects of the invention to provide apparatus that will be efficient in operation and economical to manufacture.

A further object of the invention is to provide an apparatus of the type referred to that is so constructed that the wearing parts will be thoroughly housed from the dust and of comparatively simple design so as to be thoroughly durable, and provide an apparatus that will operate efficiently for a long period.

A further object of the invention is to provide apparatus of the type referred to, especially adapted to be drawn by a horse or mule, and having supporting wheels which furnish the power for operating the mechanism.

Other objects and the features of novelty will be apparent from the following description, taken in connection with the accompanying drawings, of which:

Figure 1 is a side elevation of an apparatus embodying my invention;

Fig. 2 is an enlarged longitudinal section with certain parts broken away;

Fig. 3 is a plan view of the frame of the apparatus with certain parts shown in section;

Fig. 4 is an enlarged vertical section of a detail of the apparatus; and

Fig. 5 is a horizontal section on the line 5—5 of Fig. 1.

Referring to the drawings, 10 indicates two side rails of the frame to the forward end of which the thills 11 are attached. The side rails 10 are connected together by the cross-members 12, 13 and 14 and, to the latter, the swingletree 15 is connected by a pivot bolt 16. Handles 17 are attached to the rearward ends of the side rails 10.

An axle shaft 18 has attached to its ends the wheels 19 and supports the rearward end of the gear housing 20 which may be made in two parts that are secured together by the bolts 21. The axle shaft 18 is journalled in the bearings 22 of the housing 20 and the rear portion of the frame is supported by the struts 23 which are secured to the sides of the housing 20 by the bolts 24. A lamp bracket 25 is attached to the rear portion of the housing 20 as clearly shown in Figures 1, 2 and 3, and carries a lamp 26 for use when the apparatus is operated at night.

The forward end of the housing 20 is supported in a stirrup 27 which has its upper ends attached to the side rails 20, as indicated at 28. A small vertically arranged housing 29 is arranged in the forward end of the housing 20 and has a base 30 by means of which it is supported in the housing 20. The housing 29 carries a vertically arranged shaft 31 in the bearings 32, and a spiral gear 33 between these bearings. Mounted on the forward end of the housing 20 is a substantially cylindrical tank 34 having a removable cover 35 and three partitions, the upper one of which, as indicated at 36, is of substantially hemi-spherical shape to form the bottom of a reservoir for the insecticide material. Below the partition 36 is the partition 37 and below the latter is a partition 38 and both of these partitions are provided with central openings indicated at 39 and 40, respectively. The partitions 37 and 38 form the sides of a blower casing and the impeller 41, which is secured on the shaft 31, runs in this casing. The discharge connection from the blower casing is indicated at 42 and has attached thereto the Y-pipe 43 and the two lengths of hose 44 and 45 are attached to the branches of the Y-pipe 43 and carry at their outer ends the nozzles 46 by means of which the material is sprayed onto the vegetation. The nozzles 46 are supported by the adjustable brackets 47.

Arranged in the upper part of the tank 34 is an inclined shaft 48 having bearings at 49 and 50 and which carries a ring 51 which runs in close proximity to the partition 36 and acts as an agitator for the material in the reservoir. A shaft 52, in alignment with the shaft 48, is supported in the bearings 53 and 54 and is connected with the shaft 48 by any suitable form of coupling 55. On the lower end of the shaft 52 there is secured a spiral gear 56 which meshes with a similar gear 57 on the axle shaft 18 so as to be driven thereby. From the foregoing it will be seen that the agitator 51 is driven from the axle shaft 18.

The axle shaft 18 carries a spur gear 58 which meshes with a pinion 59 on a shaft 60 which is supported in the bearings 61 and 62 in the sides of the housing 20. A spur gear 63 is loosely mounted on the shaft 60 and has its hub provided, on one side, with the jaw clutch 64 which is adapted to be engaged by the shiftable clutch member 65 that is splined on the shaft 60. A yoke 66 carried by the shaft 67 is connected with the clutch member 65 and shifts the latter into and out of engagement with the jaw clutch 64 on the gear 63. The shaft 67 is mounted in the bearings 68, 69 and 70 and carries, at its upper end, a handle 71 by means of which it is manually actuated. The shaft 67 is divided and the parts thereof connected by the spiral spring 72 which transmits the torsional strains from one part of the shaft to the other in shifting the clutch member 65. An angle bar 73 is mounted on the cross member 13 of the frame and has its ends engaged by the handle 71 for the purpose of holding the clutch member 65 in or out of engagement with the gear 63.

The gear 63 meshes with a gear 74 on a shaft 75 that is mounted in bearings 76 and 77 in the sides of the housing 20, and the gear 74 meshes with a pinion 78 on the shaft 79, which is journalled in suitable bearings in the housing 29 and also carries the spiral gear 80 which meshes with the gear 33 on the shaft 31.

From the foregoing it will be seen that the shaft 31 is driven through the train of gears 58, 59, 63, 74, 78, 80 and 33, from the axle shaft 18, and that the ratios of said gears are such that the shaft 31 will be rotated at a relatively high speed compared with the speed of the shaft 18. In this way the impeller 41 of the blower, above referred to, will be driven at high speed and produce the blast of air that is necessary to carry and distribute the insecticide powder.

The partition 36 has a central opening 81 around which there is arranged the tubular outlet member 82 for discharging the material from the reservoir. The upper end of the shaft 31 (see Fig. 4) carries a distributor 83, substantially in the form of a disc, arranged in alignment with the member 82 but spaced from the end of the latter to provide an annular opening through which the material is discharged from the reservoir. A sleeve 84 is slidably and rotatably arranged on the exterior of the member 82 for the purpose of varying the width of the annular opening through which the material is discharged. An inverted U-shaped member 85 is carried by the member 83 and projects upwardly into the member 82 so as to agitate the material in the outlet. In order to break up any lumps and to facilitate the agitation I arrange on the member 85 the helical coils 86. These coils are loosely arranged and, when the member 83 is rotating, are thrown out, by centrifugal force, and run around the interior of the member 82 and thus break up any lumps that may exist. These coils also facilitate the distribution of the material through the annular discharge opening immediately above the upper surface of the member 83. It will be clearly seen from Fig. 4 that the rotation of the member 83 will cause the material to be thrown out, by centrifugal force, and since the position of the discharge opening is in the opening 39 in the partition 37, the material will be drawn into the blower casing by the current of air which is admitted to the space between the partitions 36 and 37 by the openings 87 in the wall of the tank 34. The parts illustrated in Fig. 4 are more fully described and claimed in my co-pending application Serial No. 666,584, filed Sept. 8, 1923.

The adjustment of the sleeve 84 is effected by rotating the sleeve on the member 82, the ends of the set screws 88 engaging inclined cam slots in the outer surface of the member 82. A rod 89 is connected with an arm 90 on the sleeve 84 and with one arm of a bell crank lever 91 which is pivoted at 92 on a bracket 93. From Fig. 2 it will be evident that the raising and lowering of the lever 91 will rotate the member 83 and thus effect a variation in the size of the discharge opening through which the material is delivered to the blower. The bracket 93 is provided with teeth 94 and the lever 91 may have any suitable form of latch for cooperation with the teeth 94 to hold the lever in its different positions.

In the operation of the apparatus, it is drawn through a field, to be sprayed, by a horse or mule and guided by the operator who grips the handles 17. The nozzles 46 are manipulated to direct the spray as desired, and the impeller 41, being driven at high speed from the axle shaft 18, creates a sufficiently strong current of air through the openings 39 and 40, to pick up the material that is discharged from the reservoir and carry it along to be discharged from the nozzles 46. The agitator 51, rotating in the material reservoir, and the agitator 85 with the coils 86 thereon, rotating in the outlet member 82, will break up any lumps that may be in the material and, cooperating with the rotating member 83, will distribute the material to the current of air in a finely divided stream and in such quantities as may be desired. When it is desired to move the apparatus without feeding the material the handle 71 is moved to the position to disconnect the clutch 65 from the jaws 64.

The housing 20 thoroughly encloses the gearing and protects the latter from dust and also permits running the gearing in oil. The housing 29 is so constructed as to thoroughly protect the bearings 32 from dust.

The entire weight of the machine being on the wheels 19 there will be adequate traction for operating all of the mechanism of the apparatus.

Having thus described my invention, what I claim is:

1. In apparatus of the class described, the combination of a frame, a supporting wheel, a reservoir having a substantially hemispherical bottom with an outlet, an agitating ring in said reservoir, a shaft on which said ring is mounted, a blower beneath said reservoir having an intake surrounding said outlet and into which said outlet discharges, a vertical impeller shaft for said blower having an upward extension which carries an agitator arranged in said outlet, and gearing for driving said shafts from said wheel.

2. In apparatus of the class described, the combination of a tank having three vertically spaced partitions therein, the upper of which is of hemi-spherical form and has a central discharge opening and forms the bottom of the material reservoir in the upper part of the tank, the two lower partitions forming the sides of a blower casing and having intake openings for air, the wall of said tank having openings for supplying air between the two upper partitions and having a discharge from said blower casing between the two lower partitions, a vertical shaft projecting into the bottom of said tank, an impeller on said shaft within said blower casing, a circular agitator in said reservoir operating in said reservoir in close proximity to the bottom thereof and means for driving said agitator and said shaft.

3. In apparatus of the class described, the combination of a frame, an axle shaft, supporting wheels on said shaft arranged to drive the latter, a housing supported at one end on said shaft and at the other end on said frame, a tank supported on said housing and having partitions forming a reservoir in the upper part and a blower casing in the lower part, a vertical shaft in said housing having an impeller thereon in said casing, gearing in said housing for driving said vertical shaft from said axle shaft, an agitator in said reservoir, an inclined shaft on which said agitator is mounted, and gearing for drivng said inclined shaft from said axle shaft.

In testimony whereof I affix my signature.

LEE B. GREEN.